No. 812,533. PATENTED FEB. 13, 1906.
H. A. TUTTLE.
REVERSING GEAR.
APPLICATION FILED APR. 5, 1905.

2 SHEETS—SHEET 1.

WITNESSES:
H. A. Lamb
S. W. Atherton

INVENTOR
Henry A. Tuttle
BY
A. M. Wooster
ATTORNEY

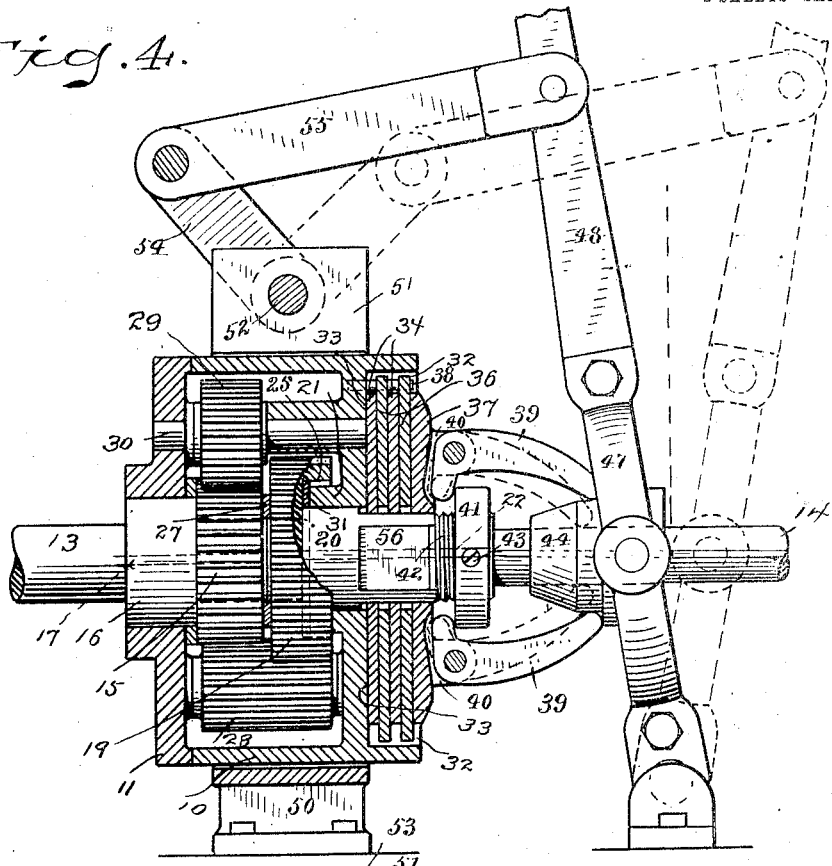
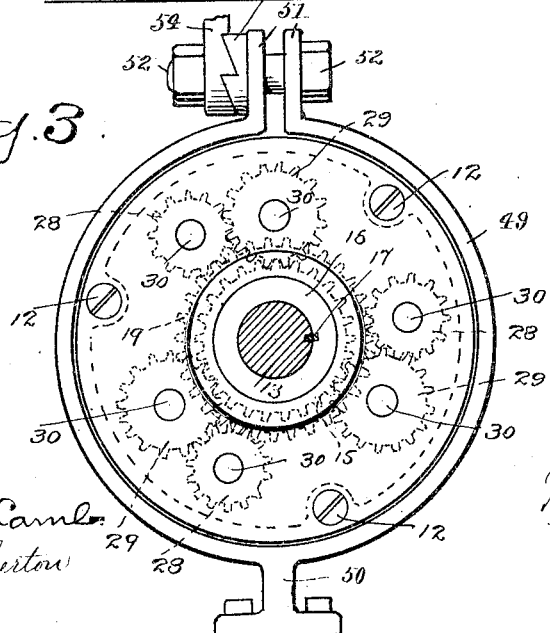

UNITED STATES PATENT OFFICE.

HENRY A. TUTTLE, OF SOUTH NORWALK, CONNECTICUT, ASSIGNOR TO H. A. TUTTLE MANUFACTURING COMPANY, OF SOUTH NORWALK, CONNECTICUT, A CORPORATION OF DELAWARE.

REVERSING-GEAR.

No. 812,533.      Specification of Letters Patent.      Patented Feb. 13, 1906.

Application filed April 5, 1905. Serial No. 254,031.

*To all whom it may concern:*

Be it known that I, HENRY A. TUTTLE, a citizen of the United States, residing at South Norwalk, county of Fairfield, State of Connecticut, have invented a new and useful Reversing-Gear, of which the following is a specification.

This invention relates to reversing-gears generally, and is especially adapted for use as a connection between the engine or driving shaft and the driven or propeller shaft in a power-launch.

It is one of the objects of the invention to produce a reversing-gear which shall be compact, strong and durable, and in which a large friction area is provided, so that a load may be picked up or dropped instantly, thus giving the operator complete control of a launch in making landings.

A further object of the invention is to produce a reversing-gear in which the number of parts shall be reduced to the minimum and they shall all be simple and inexpensive to make, thereby greatly reducing the cost of production.

A further object of the invention is to produce a reversing-gear that can be operated quickly and without reducing the speed of the engine, without danger of breakage of parts, and without serious shock to either the engine or the reversing-gear.

A further object of the invention is to produce a reversing-gear in which the friction can be adjusted by slight rotation of a screw-collar which is easy of access.

A further object of the invention is to produce a reversing-gear in which the gears and pinions shall all be of the spur type, thereby eliminating thrust and friction, which is unavoidable where beveled gears and pinions are used in which the pinions and gears are always in mesh, but either stationary or running idle except when reversing, and in which all of the pinion-studs shall be supported at both ends.

With these and other objects in view the invention consists in certain constructions and in certain parts, improvements, and combinations, which will be hereinafter described, and then specifically pointed out in the claims hereunto appended.

Figure 1:
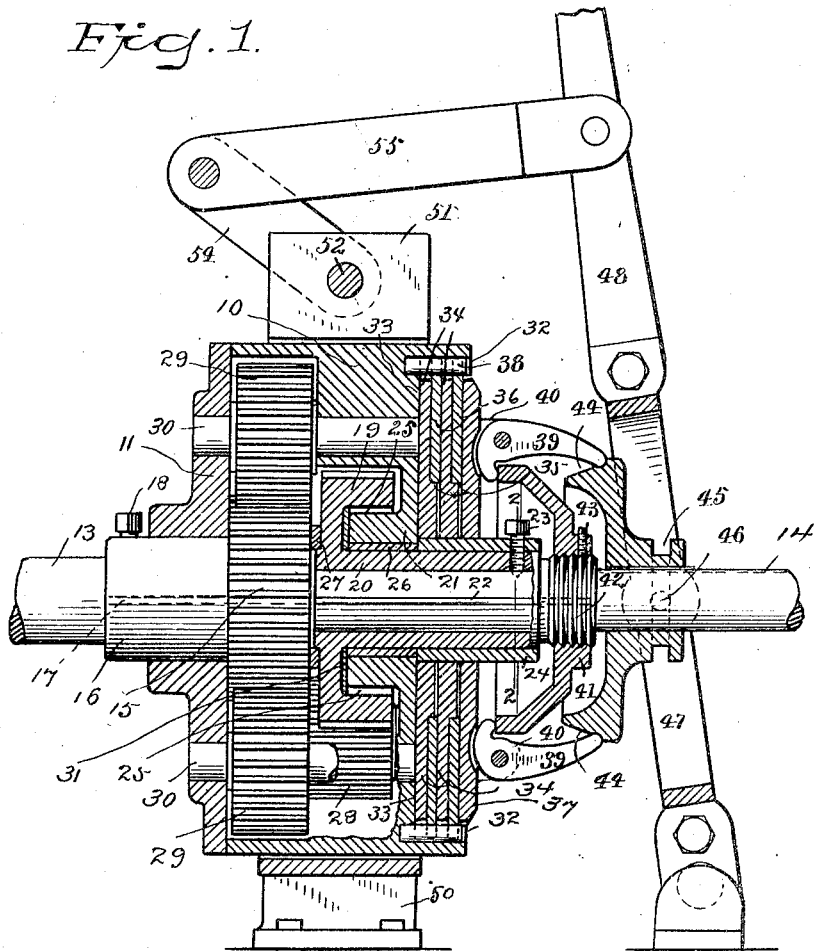
Figure 2:
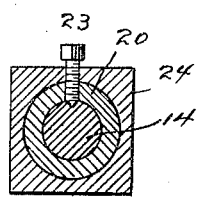

In the accompanying drawings, forming a part of this specification, Figure 1 is a longitudinal section, partly in elevation, illustrating the construction and mode of operation of my novel reversing-gear; Fig. 2, a detail sectional view on the line 2 2 in Fig. 1, showing the attachment of the friction-disk carrier to the driven shaft; Fig. 3, an end elevation as seen from the left in Fig. 1, the driving-shaft being in section; and Fig. 4 is a view, partly in longitudinal section and partly in elevation, illustrating a slightly-variant form of my novel reversing-gear, the operating-lever, and connections, which are the same in both forms, being shown in full lines in the driving position and in dotted lines in the reversing position.

10 denotes the body, and 11 the cap, of the case, which is secured to the body in any suitable manner, as by screws 12.

13 denotes the driving-shaft, and 14 the driven shaft, which of course lie in alinement.

15 denotes the driving-shaft gear, which is provided with a hub 16, journaled in the case and shown as secured to the shaft by means of a key 17 (see dotted lines, Fig. 1) and also a set-screw 18.

19 denotes the driven-shaft gear, which is provided with an elongated hub 20, journaled in a bearing 21 in the case and shown as secured to the driven shaft by means of a key 22 and a set-screw 23, which also locks the friction-disk carrier to the driven shaft.

It will be noted that the driven-shaft gear is provided with an undercut recess, as at 25, to receive bearing 21. This undercutting of the driven gear has the double advantage of providing a long bearing and at the same time enabling me to shorten the case, thereby reducing the weight and lessening the space required.

26 denotes a bushing which is interposed between the hub of the driven-shaft gear and the bearing, 27 a fiber washer which is interposed between the driving-shaft gear and the driven-shaft gear, and 31 a fiber washer which is interposed between the inner face of the driven-shaft gear and the end of the bearing.

28 denotes pinions which I term for convenience "double pinions," as they mesh both with the driven-shaft gear and with pinions 29, which I term for convenience "single pinions," and which in turn mesh with the driving-shaft gear. The gears and pinions are all of the spur type. In the present instance I have shown three each of the double pinions and the single pinions. (See Fig. 3.) These pinions are all carried by studs 30, the ends of which are journaled, respectively, in the body and the cap of the case.

32 denotes a recess in the face of the case opposite to the cap, which receives the friction device, the base of the recess (specifically indicated by 33) providing a friction-surface which is engaged by the inner friction-disk.

34 denotes metallic friction-disks, the inner of which is adapted to bear against wall 33 and which in the form illustrated in Fig. 1 are provided in their outer faces with recesses 35, which receive washers 36, preferably of another kind of metal.

37 denotes the pressure or outer friction-disk, and 38 pins which pass through the washers and engage the case to lock the washers thereto. The pressure-disk and friction-disks are provided with angular openings which correspond with friction-disk carrier 24, shown as made angular in cross-section, (see Fig. 2,) on which they are mounted. The friction-disk carrier is locked to the driven shaft in any suitable manner, as by set-screw 23, which also locks the hub of the driven-shaft gear thereto.

39 denotes bell-crank levers pivoted between ears 40 on the pressure-disk. The inner arms of the bell-crank levers bear against a screw-collar 41, which is shown in Fig. 1 as made cup-shaped and inclosing the outer end of the friction-disk carrier. This collar engages a thread 42 on the driven shaft and is locked at any desired adjustment by means of a set-screw 43.

In use any wear upon the friction-disks or washers may be readily taken up by turning the screw-collar forward on the driven shaft and locking it in place again after adjustment. The outer ends of the bell-crank levers bear against a cone 44, which may or may not be keyed to the driven shaft, so as to rotate therewith, but move longitudinally thereon, and is provided with an external circumferential groove 45, which is engaged by rollers 46, (see dotted lines, Figs. 1 and 4,) carried by a yoke 47, to which an operating-lever 48 is rigidly secured.

49 denotes a metallic brake-band carried by a base 50, the free ends of which are provided with ears 51, through which a bolt 52 passes. One of the ears is provided on its outer face with a circularly-arranged series of inclines 53, which are engaged by corresponding inclines on an arm 54, which is pivoted on the bolt.

55 denotes a link one end of which is pivoted to arm 54 and the other to the operating-lever. Oscillation of the arm will cause the inclines thereon to ride up inclines 53 on one of the ears of the strap and draw said ears toward each other, clamping the brake-band tightly around the body and locking the body against rotation.

In the form illustrated in Fig. 4 friction-disk carrier 24 is dispensed with and the hub 20 of the driven-shaft gear is provided with angular faces 56, which engage correspondingly-shaped openings in the friction-disks. In this form the recesses 35 in the metallic friction-disks are dispensed with and the washers 36 are of practically the same internal diameter as the friction-disks. The screw-collar differs in shape from the other form and does not inclose the outer end of the friction-disk carrier. The cone and the bell-crank levers also differ in configuration. In Fig. 1 the design of the case and gears is changed, so as to produce a relatively shorter and more compact structure, the friction-surface of the inner disk on the wall of the case being relatively increased. Both structures are, however, in principle the same.

The operation is as follows: The position of the parts illustrated in the drawings is the driving position, in which the brake-band is loose, but the friction device is tightened, so that the parts run solid—that is to say, the case rotates with the driving and driven shafts and all of the gears and pinions are stationary. The operation of the friction device will be readily understood from the drawings. When the operating-lever is swung toward the left, cone 44 will be moved inward thereby on the driven shaft, and the outer arms of the bell-crank levers, which are relatively long, will ride up the cone toward the position shown in the drawings. As the short arms of the bell-crank levers are in engagement with the inner face of screw-collar 41, it follows that the pivotal points of said levers on the pressure-disk will be forced inward—that is, toward the left—crowding the pressure-disk inward, clamping the washers, which are locked to the case, between the metallic friction-disks, and crowding the inner friction-disk against wall 33 of the case. As the friction-disks are carried by the driven shaft and the washers are locked to the case, it follows that the gears and pinions will be locked, and the case and driven shaft must rotate with the driving-shaft.

In the mid-position of the operating-lever, which is indicated by a dotted line in Fig. 4, the friction device has been loosened by the movement of the cone, which has been carried by the operating-lever toward the right. The movement of the cone toward the right has relieved the outward pressure upon the long arms of the bell-crank levers and has consequently relieved the pressure upon the pressure-disk, which has been transmitted to the other friction-disks and the washers and has crowded the inner friction-disk against the wall of the case. It will of course be obvious that owing to the construction of the parts but little movement of the bell-crank levers is required to lock and release the friction device. This movement of the operating-lever to the mid-position does not, however, clamp the brake-band about the case, which is still free. The effect, therefore, of the movement of the operating-lever to the mid-position is to leave everything loose, so that rotation of the driving-shaft through the engagement of the single pinions with the driving-shaft gear and the engagement of the latter with the double pinions, which in turn engage with the driven-shaft gear, will cause the case to rotate in the opposite direction from the driving-shaft, the double pinions traveling around the driven-shaft gear, which is held against rotation by the drag on the driven shaft.

To reverse, the operating-lever is moved to the dotted position, the effect of which is to tighten the brake-band about the case and lock the latter against rotation, so that the double pinions instead of traveling around the driven-shaft gear will drive the driven-shaft gear and driven shaft in the reverse direction. A movement of the operating-lever back to the mid-position will relieve the pressure of the brake-band on the case, so that the case will again be driven by the driving-shaft; but the driven shaft will not rotate. Movement of the operating-lever to the full-line position will operate the friction device, which will lock the case and the two shafts together, so that the case and driven shaft will rotate with the driving-shaft.

Having thus described my invention, I claim—

1. A reversing-gear comprising driving and driven shafts in line with each other and spur-gears at their contiguous ends, the gear on the driven shaft having an undercut recess and an elongated hub, a case having a bearing for said hub extending into said undercut recess means for locking the case against rotation, single pinions journaled in the case and engaging the driving-shaft gear and double pinions journaled in the case and engaging the single pinions and the driven-shaft gear.

2. A reversing-gear comprising driving and driven shafts in line with each other and spur-gears at their contiguous ends, the gear on the driven shaft having an undercut recess and an elongated hub, a case having a bearing for said hub extending into said undercut recess, single pinions journaled in the case and engaging the driving-shaft gear, double pinions journaled in the case and engaging the single pinions and the driven-shaft gear, a friction-disk carrier rigidly secured to said hub, friction-disks carried thereby, washers locked to the case and means for clamping the disks and washers together and against the case to lock the driven shaft thereto.

3. A reversing-gear comprising driving and driven shafts in line with each other and spur-gears at their contiguous ends, the driven-shaft gear having an elongated hub, a rotary case having a recess in its face, single pinions journaled in the case and engaging the driving-shaft gear, double pinions journaled in the case and engaging the single pinions and the driven-shaft gear, a friction-disk carrier rigidly secured to the hub, friction-disks and washers lying in the recess in the case and means for clamping the friction-disks and washers together and against the base-wall of the recess.

4. A reversing-gear comprising driving and driven shafts in line with each other and spur-gears at their contiguous ends, the driven-shaft gear having an elongated hub, a rotary case, single pinions journaled in the case and engaging the driving-shaft gear, double pinions journaled in the case and engaging the single pinions and the driven-shaft gear, a friction-disk carrier rigidly secured to the hub, friction-disks and a pressure-disk carried by said hub, washers locked to the case, an adjustable screw-collar on the driven shaft, bell-crank levers pivoted on the pressure-disk and engaging the screw-collar and a cone sliding on the driven shaft and acting on the bell-crank levers to clamp the pressure-disk, friction-disks and washers together and against the case.

5. A reversing-gear comprising driving and driven shafts in line with each other and spur-gears at their contiguous ends, a rotary case, single pinions journaled in the case and engaging the driving-shaft gear, double pinions journaled in the case and engaging the single pinions and the driven-shaft gear, a brake-band, an arm and intermediate connections for clamping the brake-band about the case, friction-disks carried by the driven shaft, washers locked to the case, an adjustable screw-collar, bell-crank levers engaging the screw-collar and acting on the friction-disks and washers, a cone sliding on the driven shaft and acting on the bell-crank levers, an operating-lever pivoted to the cone and a link connecting the operating-lever and the arm, said operating-lever at its intermediate position holding both the brake-band and the friction device loose, at one extreme of its movement clamping the brake-band and leaving the friction device loose and at the other extreme of its movement clamping the friction-washers and leaving the brake-band loose.

6. A reversing-gear comprising driving and driven shafts in line with each other and spur-gears at their contiguous ends, a rotary case, single pinions journaled in the case and engaging the driving-shaft gear, double pinions journaled in the case and engaging the single pinions and the driven-shaft gear, friction-disks carried by the driven shaft, washers, pins engaging the washers and the case for locking the washers against rotation and means for clamping the friction-disks and washers together and against the case to lock the case to the driven shaft.

In testimony whereof I affix my signature in presence of two witnesses.

HENRY A. TUTTLE.

Witnesses:
A. M. WOOSTER,
S. W. ATHERTON.